United States Patent
Murakami et al.

(10) Patent No.: US 10,411,542 B2
(45) Date of Patent: Sep. 10, 2019

(54) FIXING STRUCTURE AND FIXING METHOD FOR WIRE CONNECTION PLATE, AND ROTATING ELECTRICAL MACHINE

(71) Applicants: Tadashi Murakami, Tokyo (JP); Kouichi Ojima, Tokyo (JP); Masaya Inoue, Tokyo (JP)

(72) Inventors: Tadashi Murakami, Tokyo (JP); Kouichi Ojima, Tokyo (JP); Masaya Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1185 days.

(21) Appl. No.: 14/423,172

(22) PCT Filed: Oct. 15, 2012

(86) PCT No.: PCT/JP2012/076595
§ 371 (c)(1),
(2) Date: Feb. 23, 2015

(87) PCT Pub. No.: WO2014/061073
PCT Pub. Date: Apr. 24, 2014

(65) Prior Publication Data
US 2015/0229178 A1 Aug. 13, 2015

(51) Int. Cl.
H02K 3/50 (2006.01)
H02G 5/06 (2006.01)
(Continued)

(52) U.S. Cl.
CPC .................. *H02K 3/50* (2013.01); *H02G 5/06* (2013.01); *H02K 3/28* (2013.01); *H02K 3/38* (2013.01);
(Continued)

(58) Field of Classification Search
CPC .. H02K 3/50; H02K 3/28; H02K 3/38; H02K 3/04; H02K 3/30; H02K 3/32; H02K 5/02;
(Continued)

(56) References Cited

U.S. PATENT DOCUMENTS

2006/0175922 A1 8/2006 Masuda et al.
2011/0175470 A1* 7/2011 Kinoshita ............... F04B 35/04
310/71
(Continued)

FOREIGN PATENT DOCUMENTS

JP 35-1929 Y1 2/1960
JP 61-7255 U 1/1986
(Continued)

OTHER PUBLICATIONS

Sanyo Electric LTD, Miniature Generator, Jan. 17, 1986, JP 61007255 (English Machine Translation).*
(Continued)

*Primary Examiner* — Julio C. Gonzalez
*Assistant Examiner* — Alexander A Singh
(74) *Attorney, Agent, or Firm* — Sughrue Mion, PLLC; Richard C. Turner

(57) ABSTRACT

Provided is a fixing structure for fixing a wire connection plate including a busbar (9) having an annular shape, and a wire connection plate holder (10) for holding the busbar (9). The fixing structure includes a frame (5) having a cylindrical shape, for accommodating the wire connection plate therein, and a sheet metal member (12) for fixing the wire connection plate. One end of the sheet metal member (12) is fixed on a flange (4) of the frame (5), and another end of the sheet metal member (12) presses an end surface of the wire connection plate in an axial direction of the frame (5), to thereby fix the wire connection plate. The wire connection plate is fixed by elasticity of the sheet metal member (12), and hence the wire connection plate can be held even under application of impact load.

23 Claims, 5 Drawing Sheets

(51) Int. Cl.
*H02K 3/28* (2006.01)
*H02K 3/38* (2006.01)

(52) U.S. Cl.
CPC ..... *H02K 2203/09* (2013.01); *Y10T 29/49826* (2015.01)

(58) Field of Classification Search
CPC ........ H02K 5/04; H02K 2203/09; H02G 5/06; Y10T 29/49826
USPC ............... 310/89, 71; 174/520, 68.2; 29/428
See application file for complete search history.

(56) References Cited

U.S. PATENT DOCUMENTS

2011/0215662 A1* 9/2011 Lee ......................... H02K 3/38
310/71

2013/0193785 A1* 8/2013 Kimmich ............... H02K 5/225
310/52

FOREIGN PATENT DOCUMENTS

| JP | 64-2564 U | 1/1989 |
|----|-----------|--------|
| JP | 2002-153003 A | 5/2002 |
| JP | 2004-064993 A | 2/2004 |
| JP | 2006-223012 A | 8/2006 |
| JP | 2008-011654 A | 1/2008 |
| JP | 2010-534055 A | 10/2010 |
| JP | 4789676 B2 | 10/2011 |
| WO | 2009/013042 A1 | 1/2009 |

OTHER PUBLICATIONS

International Search Report for PCT/JP2012/076595 dated Jan. 15, 2013.

* cited by examiner

FIXING STRUCTURE AND FIXING METHOD FOR WIRE CONNECTION PLATE, AND ROTATING ELECTRICAL MACHINE

CROSS REFERENCE TO RELATED APPLICATIONS

This application is a National Stage of International Application No. PCT/JP2012/076595 filed Oct. 15, 2012, the contents of which are incorporated herein by reference in their entirety.

TECHNICAL FIELD

The present invention relates to a wire connection plate fixing structure, a wire connection plate fixing method, and a rotating electrical machine, and more particularly, to a fixing structure and a fixing method for a wire connection plate to be used as a component for supplying an electric current to a coil in a rotating electrical machine, and to a rotating electrical machine using the wire connection plate.

BACKGROUND ART

Hitherto, when a wire connection plate is fixed in a rotating electrical machine, as described in, for example, Patent Literature 1, grooves are formed in a wire connection plate holder, and a busbar is inserted into each of the grooves. Then, the busbar is fixed in a radial direction, to thereby fix the wire connection plate. Alternatively, the wire connection plate holder and an insulating member for ensuring insulation between a coil and a stator core are fitted onto each other, to thereby fix the wire connection plate.

CITATION LIST

Patent Literature

[PTL 1] JP 4789676 B2

SUMMARY OF INVENTION

Technical Problems

However, when the busbar is fixed in the holder as described in Patent Literature 1, the fixing between the holder and the busbar depends on a welded portion between the busbar and the coil. Accordingly, when impact load such as vibration is applied to the rotating electrical machine, the wire connection plate is moved to cause stress on the welded portion. As a result, there is a problem in that it is necessary to strengthen the welded portion.

Further, when the stator core and the wire connection plate are fixed to each other through insert molding, equipment such as a large-size molding machine for performing insert molding is required. As a result, there is a problem in that mass-productivity is reduced.

The present invention has been made in order to solve the above-mentioned problems, and has an object to obtain a fixing structure and a fixing method for a wire connection plate, and a rotating electrical machine using the wire connection plate, which require no large-size equipment and are capable of suppressing stress on a welded portion and holding the wire connection plate even under application of impact load.

Solution to Problems

According to one embodiment of the present invention, there is provided a wire connection plate fixing structure for fixing a wire connection plate, the wire connection plate including a busbar formed into an annular shape, and a holder for holding the busbar, the wire connection plate fixing structure including: a frame having a cylindrical shape, for accommodating the wire connection plate therein; and a sheet metal member for fixing the wire connection plate, one end of the sheet metal member being fixed on an outer peripheral portion of the frame, another end of the sheet metal member being a movable end extending toward the wire connection plate accommodated in the frame, for pressing an end surface of the wire connection plate in an axial direction of the frame, to thereby fix the wire connection plate.

Advantageous Effects of Invention

The present invention provides the wire connection plate fixing structure for fixing the wire connection plate, the wire connection plate including the busbar formed into an annular shape, and the holder for holding the busbar, the wire connection plate fixing structure including: the frame having a cylindrical shape, for accommodating the wire connection plate therein; and the sheet metal member for fixing the wire connection plate, the one end of the sheet metal member being fixed on the outer peripheral portion of the frame, the another end of the sheet metal member being the movable end extending toward the wire connection plate accommodated in the frame, for pressing the end surface of the wire connection plate in the axial direction of the frame, to thereby fix the wire connection plate. The wire connection plate is fixed by elasticity of the sheet metal member, and hence there is no need to use large-size equipment. Further, stress on the welded portion can be suppressed and the wire connection plate can be held even under application of impact load.

DESCRIPTION OF EMBODIMENTS

Now, a plurality of embodiments of the present invention are described. Note that, combinations of the embodiments are not described below, but features of the respective embodiments may be combined as appropriate.

First Embodiment

Figure 1A:
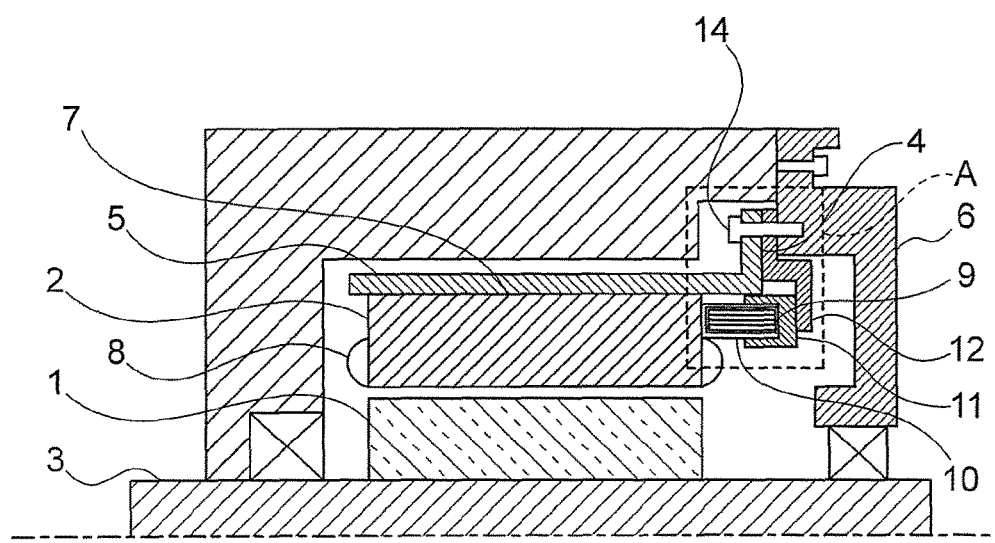
FIG. 1 are a cross-sectional view and a perspective view each illustrating configurations of a wire connection plate fixing structure and a rotating electrical machine according to a first embodiment of the present invention.
Figure 1B:
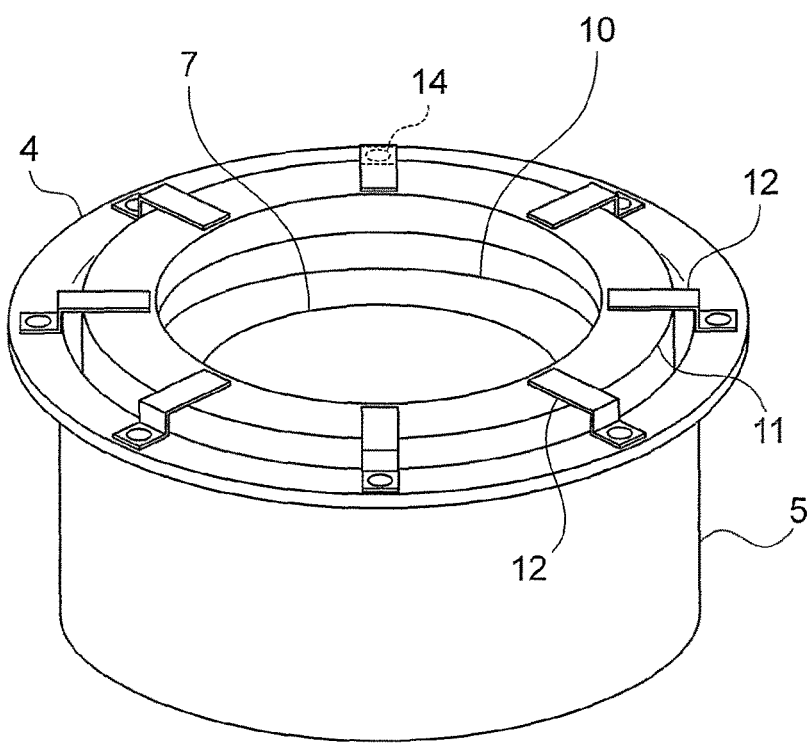

FIGS. 1(a) and 1(b) are a cross-sectional view and a perspective view each illustrating configurations of a wire connection plate fixing structure and a rotating electrical machine according to a first embodiment of the present invention. Note that, the cross-sectional view of FIG. 1(a) illustrates only a left half of the rotating electrical machine, and a right half of the rotating electrical machine is omitted. The left half and the right half of the rotating electrical machine are configured in line symmetry with respect to the dot-and-dash line of FIG. 1(a).

As illustrated in FIG. 1, the rotating electrical machine includes a columnar rotor 1 provided in a rotatable manner, and a cylindrical stator 2 arranged on an outer side of the rotor 1. An outer peripheral surface of the rotor 1 and an inner peripheral surface of the stator 2 are opposed to each other with a predetermined space therebetween. The rotor 1 is fixed on a shaft 3. The shaft 3 passes through a center of the rotor 1. A plurality of permanent magnets (not shown) are embedded in an outer peripheral portion of the rotor 1 at equal intervals in a circumferential direction. Each end of the shaft 3 is supported in a rotatable manner by a bearing member (not shown) such as a bearing. The rotor 1 is rotated along with rotation of the shaft 3.

Note that, in the following description, an axial direction of the rotor 1 (that is, a longitudinal direction of the shaft 3) and a center axis direction of the cylindrical stator 2 are referred to as an "axial direction". A direction orthogonal to the "axial direction" is referred to as a "radial direction". A direction extending along a circumference of a circle that is drawn around a point on a rotation axis and on a plane orthogonal to the point is referred to as a "circumferential direction".

The stator 2 is fitted on a frame 5. As illustrated in FIG. 1(b), the frame 5 has a cylindrical shape, and includes a flange 4 (outer peripheral portion) at one end thereof. The flange 4 is formed into an annular shape, and protrudes radially outward with respect to an outer periphery of the frame 5. The flange 4 and the frame 5 are formed integrally with each other. The cylindrical frame 5 has a hollow inside. As illustrated in FIG. 1(a), the rotor 1, the stator 2, a busbar 9, a wire connection plate holder 10, and a wire connection plate cover 11 are disposed in the hollow inside. As illustrated in FIGS. 1(a) and 1(b), an end surface of the wire connection plate cover 11 protrudes outward with respect to a position of the flange 4 of the frame 5. The flange 4 is fastened to an aluminum frame 6 (housing) with bolts 14. An outer frame of the rotating electrical machine is composed of the frame 5 and the aluminum frame 6. Therefore, the frame 5 and the aluminum frame 6 are collectively referred to as an outer frame 5, 6.

The stator 2 includes a stator core 7, coils 8, the busbars 9, the wire connection plate holders 10, the wire connection plate covers 11, and sheet metal members 12. The stator core 7 is formed into a cylindrical shape. A plurality of teeth (not shown) are aligned in the circumferential direction on an inner peripheral side of the stator core 7. The teeth are protruded with respect to an inner peripheral side of the stator core 7. Each coil 8 is inserted into slots (not shown) formed between the teeth of the stator core 7, and is wound around one or a plurality of the teeth. Each busbar 9 is electrically connected to one end of the coil 8. The busbar 9 is formed in such a manner that a plurality of busbar members each formed into an annular shape are arranged and stacked concentrically in the radial direction. The busbar 9 is disposed in the wire connection plate holder 10. Note that, the busbar 9 and the wire connection plate holder 10 form a "wire connection plate". Each wire connection plate cover 11 is formed into an annular shape. As illustrated in FIG. 1(a), the wire connection plate cover 11 has a substantially U-shaped cross-section. The wire connection plate cover 11 is provided so as to allow the wire connection plate holder 10 and the busbar 9 to be inserted therein. The wire connection plate cover 11 covers the wire connection plate holder 10. The wire connection plate cover 11 is made of an insulating material such as a resin formed of polyphenylenesulfide (PPS), nylon, or the like. The wire connection plate cover 11 has insulating property to secure insulation between the busbar 9 and an external environment.

The sheet metal members 12 are made of metal having flexibility and/or elasticity. In FIG. 1(b), eight sheet metal members 12 are provided. However, an arbitrary number of sheet metal members 12 may be provided. Note that, the sheet metal member 12 is provided in order to press and fix the wire connection plate cover 11, and hence at least two sheet metal members 12 are necessary to be provided. It is desired that the sheet metal members 12 be arranged at equal intervals in the circumferential direction. As illustrated in FIG. 1(b), each sheet metal member 12 is formed into a substantially rectangular elongate plate. As illustrated in FIG. 1(a), one end of the sheet metal member 12 is fixed on the flange 4 of the frame 5 with the bolt 14. Therefore, the bolt 14 fastens the flange 4, the sheet metal member 12, and the aluminum frame 6 at the same time. Further, another end of the sheet metal member 12 extends in the radial direction toward the inside of the frame 5. The another end of the sheet metal member 12 is not fixed but is a movable end. The another end of the sheet metal member 12 presses the wire connection plate holder 10 and the wire connection plate cover 11 onto the stator core 7. Further, the sheet metal member 12 is bent in conformity to a positional difference between an end surface of the flange 4 and an end surface of the wire connection plate cover 11. As illustrated in FIG. 1(a), the sheet metal member 12 is bent at two points so as to have a stepped shape by making a valley fold at substantially 90° and then making a mountain fold at substantially 90°. However, the bending angle is not limited to 90°, and an arbitrary angle may be adopted. The sheet metal member 12 is thus subjected to sheet metal bending, and hence has a function of a plate spring. Therefore, an axial end of the "wire connection plate" formed of the wire connection plate holder 10 and the busbar 9 is pressed onto the end surface of the stator core 7 in the axial direction by an elastic force of the spring of the sheet metal member 12, to thereby fix the "wire connection plate".

At this time, fluctuations in tolerance occur in a distance between the stator core 7 and the frame 5, a height (axial length) of the wire connection plate holder 10, and a height (axial length) of the wire connection plate cover 11. Accordingly, in every product, a position of the end surface of the wire connection plate cover 11 is not completely the same, and hence it is necessary to absorb each tolerance. Further, a motor used in an electric vehicle (EV), a hybrid vehicle (HV), and the like has a large size and is subjected to a large external force such as vibration. Thus, a case where a pressing force of the sheet metal member 12 exceeds 10 G is assumable. In this case, bending stress of the sheet metal member 12 is excessive, and hence the sheet metal member 12 may yield. In order to solve this problem, it is only necessary to increase a length of the sheet metal member 12.

However, in order to increase the length of the sheet metal member 12, a space is needed. However, in the EV and the HV, the space is limited, and an outer diameter of the rotating electrical machine is also limited. Thus, the layout thereof becomes important.

In this context, this embodiment employs a configuration using the sheet metal member 12 having one end held on the outer peripheral portion of the outer frame 5, 6 and another end extending in the radial direction and having a force of pressing the axial end of the wire connection plate cover 11. With this configuration, in a limited small space, a satisfactorily long distance can be secured between a fulcrum and a point of application of the sheet metal member 12, and hence the sheet metal member 12 does not yield. Thus, the sheet metal member 12 can absorb the above-mentioned fluctuations in tolerance, and ensure a necessary pressing force.

Figure 2A:
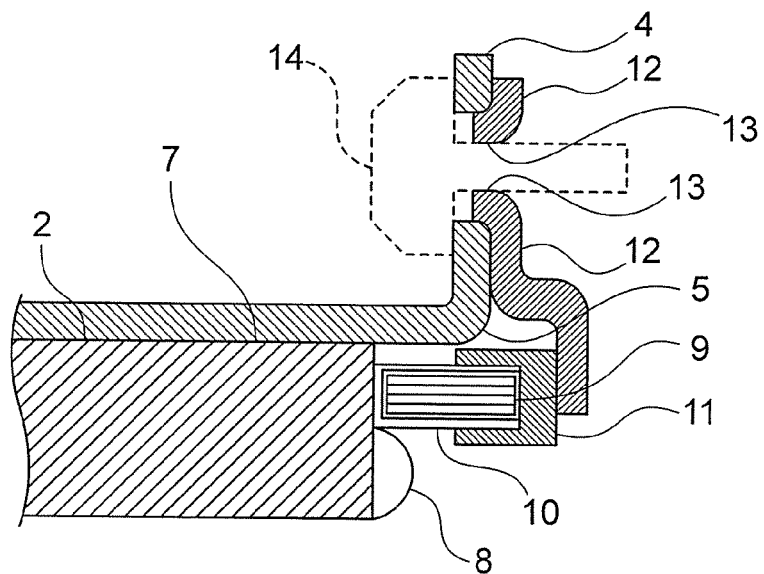
FIG. 2 are a partial cross-sectional view illustrating a configuration of the wire connection plate fixing structure, and a perspective view illustrating a burring portion of a sheet metal member according to the first embodiment of the present invention.

Note that, in this case, at a vicinity of the end surface of the wire connection plate holder 10 on the stator core 7 side, the wire connection plate holder 10 is held in contact with the teeth (not shown) of the stator core 7 around which the coil 8 is wound (see FIGS. 1(a) and 2(a)). Therefore, the teeth restrain the wire connection plate holder 10 from moving in the radial direction, and hence the wire connection plate holder 10 is fixed further firmly.

Further, as described above, the sheet metal member 12 is made of metal. The sheet metal member 12 presses the busbar 9 through an intermediation of the wire connection plate cover 11 having insulating property, thereby being capable of ensuring insulation between the sheet metal member 12 and the busbar 9. Further, the wire connection plate cover 11 has a ring shape, and hence can equalize the pressing force of the sheet metal member 12. Consequently, the number of the sheet metal members 12 can be reduced. Further, the wire connection plate holder 10, the busbar 9, and the wire connection plate cover 11 are fixed together using the sheet metal member 12, and hence no load is applied to a welded portion between the coil 8 and the busbar 9.

Figure 2B:
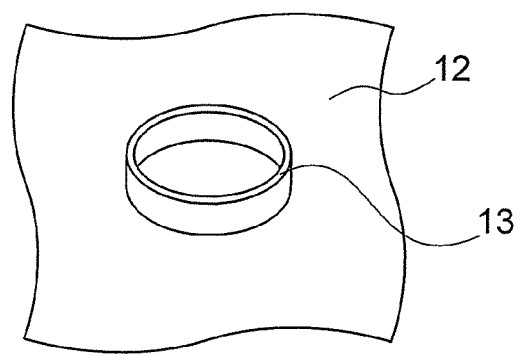

In order to describe the configuration of this embodiment in detail, the square "A" illustrated in FIG. 1 is extracted and illustrated in FIG. 2. A hole into which the bolt 14 is to be inserted is formed in the sheet metal member 12. As illustrated in FIG. 2(b), burring process is performed around the hole, to thereby form a burring portion 13. Note that, burring process is a process of raising a portion around the hole to form a raised portion (burring portion 13). As a processing method therefor, in general, a prepared hole is formed by punching, and then the raising is performed depending on a thickness of a plate.

A hole into which the bolt 14 is to be inserted is formed also in the flange 4 of the frame 5. As illustrated in FIG. 2(a), the burring portion 13 of the sheet metal member 12 is press-fitted into the hole of the flange 4, to thereby fix the sheet metal member 12. A size of an outer diameter of the burring portion 13 is equal to or slightly smaller than an inner diameter of the hole of the flange 4. Accordingly, when the burring portion 13 of the sheet metal member 12 is press-fitted into the hole of the flange 4, the sheet metal member 12 is fixed. In this manner, a component is completed by the frame 5 and the stator 2, thereby being easy to ship the stator 2 and the rotor 1 separately.

Note that, a wire connection plate fixing method is briefly described. First, the wire connection plate is accommodated in the frame 5, and then, the sheet metal member 12 formed of a flat plate is prepared. One end of the sheet metal member 12 is fixed on the flange 4 of the frame 5, and another end of the sheet metal member 12 extends toward the wire connection plate accommodated in the frame 5. The another end presses the end surface of the wire connection plate in the axial direction of the frame 5, to thereby fix the wire connection plate. With this procedure, the wire connection plate is fixed.

As described above, according to the first embodiment, in the wire connection plate including the busbar 9 formed into an annular shape and the holder 10 for holding the busbar 9, one end of the sheet metal member 12 is fixed on the flange 4 of the outer peripheral portion of the frame 5, and another end of the sheet metal member 12 extends in the radial direction so as to press the axial end of the wire connection plate in the axial direction, to thereby mechanically fix the wire connection plate. Accordingly, even under application of impact load such as vibration, the wire connection plate can be held. In this manner, it is possible to prevent movement of the wire connection plate from causing stress on the welded portion. Further, the wire connection plate is fixed by the sheet metal member 12, and hence a satisfactory pressing force can be ensured in the limited space. Further, insert molding or the like is not performed unlike the related art, and hence large-size equipment is not required at the time of assembly.

Further, the wire connection plate is pressed by the elastic force of the sheet metal member 12 in the axial direction, and hence the wire connection plate can be fixed so that the sheet metal member 12 absorbs fluctuations in tolerance of components. Further, the elastic force of the sheet metal member 12 is used, and hence the wire connection plate can be pressed by a larger force as displacement of the wire connection plate becomes larger.

Second Embodiment

Figure 3:
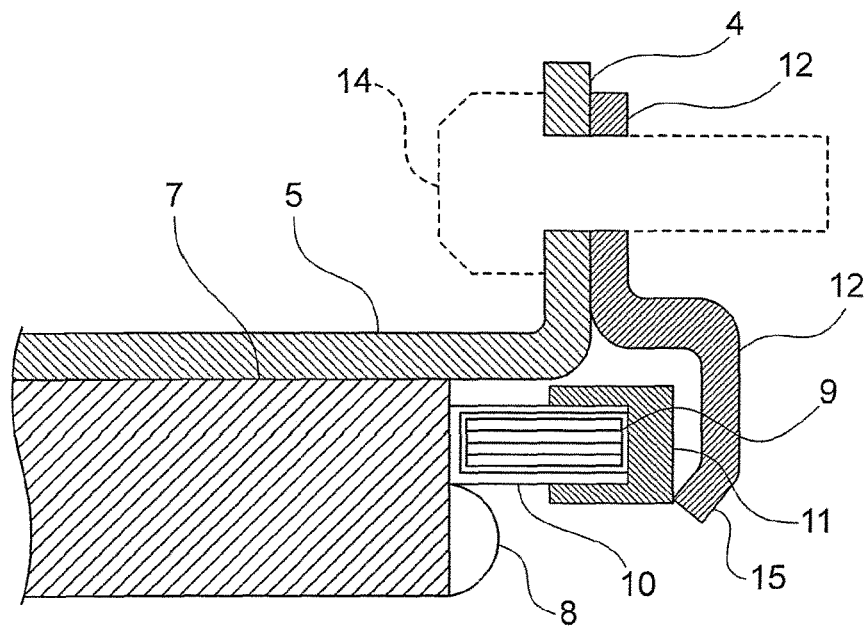
FIG. 3 is a partial cross-sectional view illustrating a configuration of a wire connection plate fixing structure according to a second embodiment of the present invention.

FIG. 3 is a cross-sectional view illustrating configurations of a wire connection plate fixing structure and a rotating electrical machine according to a second embodiment of the present invention. The entire configuration of the rotating electrical machine according to the second embodiment is the same as the configuration described in the above-mentioned first embodiment, and hence description thereof is omitted herein. FIG. 3 and FIG. 2 differ in that a caulking portion 15 is formed at one end of the sheet metal member 12 in FIG. 3. The caulking portion 15 is formed into a claw-like shape so as to protrude from the sheet metal member 12. As illustrated in FIG. 3, the caulking portion 15 may be formed by bending the sheet metal member 12, or may be formed by protruding a part of the sheet metal member 12. The other configuration is the same as that of the above-mentioned first embodiment, and hence description thereof is omitted herein.

Note that, "caulking" is a method of fixing components together using plastic deformation of metal. That is, a claw or a metal fitting (rivet) fitted in a joined portion is hammered or fastened with a tool such as pliers to cause deformation of the claw or the metal fitting, to thereby firmly fix the joined portion. The deformation encompasses crushing, expanding, bending and crushing, and bending and twisting.

In this embodiment, under a state in which the caulking portion 15 is held in contact with the wire connection plate cover 11, the caulking portion 15 is hammered into the wire connection plate cover 11 with a tool. Thus, a shape of the claw of the caulking portion 15 is deformed so that the caulking portion 15 bites into the wire connection plate cover 11. At this time, the wire connection plate cover 11 is also deformed together with the caulking portion 15, and thus the caulking portion 15 and the wire connection plate cover 11 are firmly joined to each other. In this manner, using the caulking portion 15, the sheet metal member 12 is caulked and fixed on the wire connection plate cover 11. Thus, the wire connection plate can be fixed firmly also in the circumferential direction.

Note that, FIG. 3 illustrates a case where the sheet metal member 12 is held in contact with the wire connection plate cover 11 only at the caulking portion 15, but the present invention is not limited to this case. It is only necessary that the caulking portion 15 be caulked on the wire connection plate cover 11. As illustrated in FIG. 2, the sheet metal member 12 may be held in contact with the wire connection plate cover 11.

As described above, also in this embodiment, the wire connection plate holder 10, the busbar 9, and the wire connection plate cover 11 are pressed and fixed using the elastic force of the sheet metal member 12, and hence the same effect as that of the above-mentioned first embodiment can be attained. In addition, in this embodiment, the sheet metal member 12 is caulked and fixed on the wire connection plate cover 11 by the caulking portion 15, and hence the wire connection plate can be fixed firmly also in the circumferential direction.

Note that, FIG. 3 illustrates a case where no burring portion 13 (see FIG. 2) is formed on the sheet metal member 12. However, also in this embodiment, the burring portion 13 may be formed. In this case, the wire connection plate can be fixed further firmly.

Third Embodiment

Figure 4:
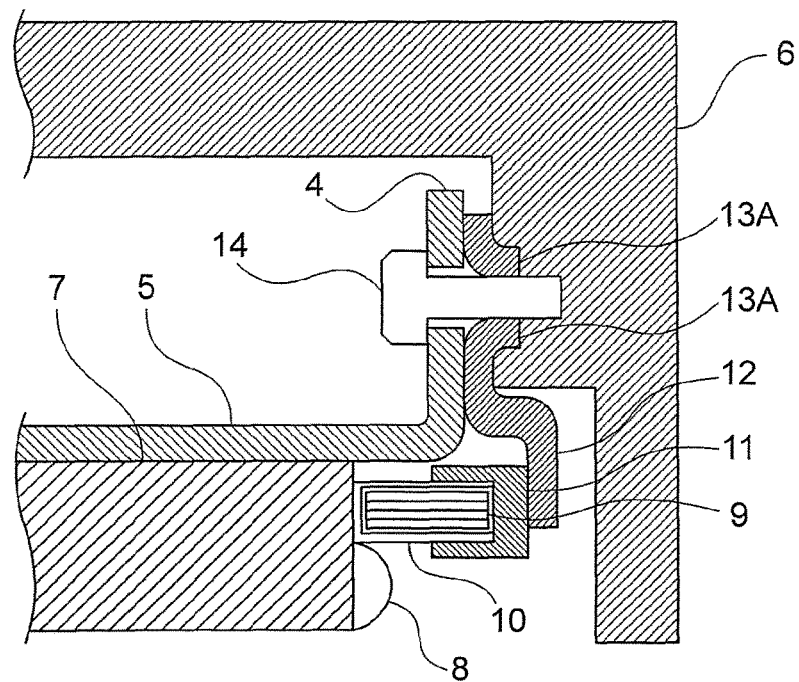
FIG. 4 is a partial cross-sectional view illustrating a configuration of a wire connection plate fixing structure according to a third embodiment of the present invention.

FIG. 4 is a cross-sectional view illustrating configurations of a wire connection plate fixing structure and a rotating electrical machine according to a third embodiment of the present invention. The entire configuration of the rotating electrical machine according to the third embodiment is the same as the configuration described in the above-mentioned first embodiment, and hence description thereof is omitted herein. FIG. 4 and FIG. 2 differ in that a burring portion 13A is protruded toward the aluminum frame 6 side in FIG. 4, even though the burring portion 13 is protruded toward the flange 4 side in FIG. 2. The other configuration is the same as that of the above-mentioned first embodiment, and hence description thereof is omitted herein.

Holes into which the bolts 14 are to be inserted are formed also in the aluminum frame 6. As illustrated in FIG. 4, the burring portion 13A of the sheet metal member 12 is press-fitted into each of the holes of the aluminum frame 6, to thereby fix the sheet metal member 12. A size of an outer diameter of the burring portion 13A is equal to or slightly smaller than an inner diameter of each of the holes of the aluminum frame 6. Accordingly, when the burring portion 13A of the sheet metal member 12 is press-fitted into each of the holes of the aluminum frame 6, the sheet metal member 12 is fixed. In addition, the flange 4 of the frame 5, the sheet metal members 12, and the aluminum frame 6 are fastened together with the bolts 14. In this manner, a component is completed by the aluminum frame 6, the frame 5, and the stator 2, thereby being easy to ship the stator 2 and the rotor 1 separately.

Note that, in a case where a thickness of the frame 5 including the flange 4 is small, when the burring portion 13 is press-fitted into the flange 4 as illustrated in FIG. 2, such a case is assumable that a depth of a press-fitted portion of the burring portion 13 is not satisfactory. Therefore, in a case where the thickness of the frame 5 is small, as in this embodiment, the burring portion 13A is formed on the aluminum frame 6 side, and thus the depth of the press-fitted portion of the burring portion 13A is satisfactory. As a result, the frame 5 and the sheet metal member 12 can be fixed to each other.

As described above, also in this embodiment, the wire connection plate holder 10, the busbar 9, and the wire connection plate cover 11 are pressed and fixed using the elastic force of the sheet metal member 12, and hence the same effect as that of the above-mentioned first embodiment can be attained. In addition, in this embodiment, the burring portion 13A is formed on the sheet metal member 12, and the burring portion 13A is press-fitted and fixed into the aluminum frame 6, thereby being capable of further firmly fixing the sheet metal member 12 and the aluminum frame 6 to each other. Further, this embodiment is effective even in a case where the thickness of the frame 5 is small.

Fourth Embodiment

Figure 5:
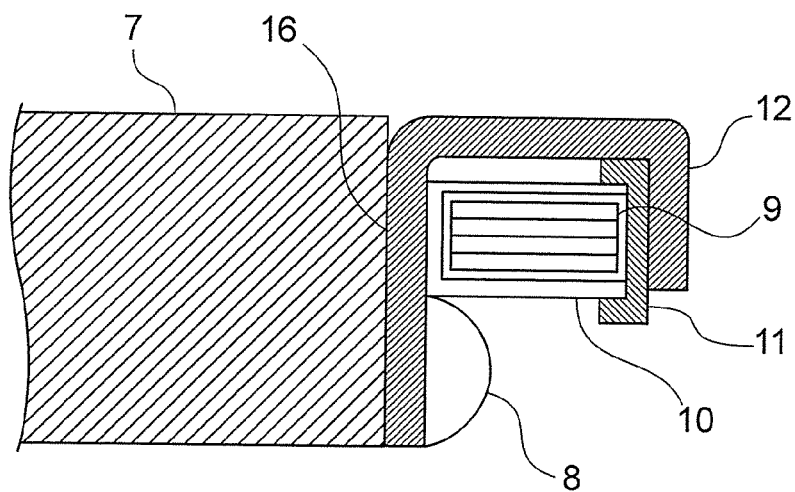
FIG. 5 is a partial cross-sectional view illustrating a configuration of a wire connection plate fixing structure according to a fourth embodiment of the present invention.

FIG. 5 is a cross-sectional view illustrating configurations of a wire connection plate fixing structure and a rotating electrical machine according to a fourth embodiment of the present invention. The entire configuration of the rotating electrical machine according to the fourth embodiment is the same as the configuration described in the above-mentioned first embodiment, and hence description thereof is omitted herein. FIG. 5 and FIG. 1 differ in that the sheet metal member 12 is fixed on the stator core 7 in FIG. 5. Further, the sheet metal member 12 has a shape different from that of FIG. 1. Further, in FIG. 1, the flange 4 of the frame 5, the sheet metal member 12, and the aluminum frame 6 are fastened together with one bolt 14 at the same time. Although not shown in FIG. 5, in this embodiment, the flange 4 of the frame 5 and the aluminum frame 6 are fastened together directly with one bolt without an intermediation of the sheet metal member 12 (for example, see FIG. 6). The other configuration is the same as that of the above-mentioned first embodiment, and hence description thereof is omitted herein.

In this embodiment, as illustrated in FIG. 5, the sheet metal member 12 is formed into a substantially U-shape, and one end of the sheet metal member 12 is fixed on the stator core 7. As a fixing method, welding or fastening with a bolt may be employed. At an inside of the sheet metal member 12 having a substantially U-shape, the wire connection plate holder 10, the busbar 9, and the wire connection plate cover 11 are arranged. Then, as illustrated in FIG. 5, another end of the sheet metal member 12 is brought into contact with the end surface of the wire connection plate cover 11. In this manner, the sheet metal member 12 presses the axial end of the wire connection plate formed of the wire connection plate holder 10 and the busbar 9 in the axial direction, to thereby fix the wire connection plate.

In this embodiment, as illustrated in FIG. 5, the sheet metal member 12 is bent at two points so as to have a substantially U-shape by making a mountain fold at substantially 90° and then making a mountain fold at substantially 90° again. The bending positions are determined as appropriate depending on sizes of the wire connection plate holder 10 and the wire connection plate cover 11. Note that, the bending angle is not limited to 90°, and an arbitrary angle may be adopted. The sheet metal member 12 is thus subjected to sheet metal bending, and hence has a function of a plate spring. Therefore, the axial end of the wire connection plate is pressed onto the end surface of the stator core 7 in the axial direction by the elastic force of the sheet metal member 12, to thereby fix the "wire connection plate".

Further, at the vicinity of the end surface of the wire connection plate holder 10 on the stator core 7 side, the wire connection plate holder 10 is held in contact with the teeth (not shown) of the stator core 7 around which the coil 8 is wound (see FIGS. 1(a) and 2(a)). Therefore, the teeth restrain the wire connection plate holder 10 from moving in the radial direction, and hence the wire connection plate holder 10 is fixed further firmly. In this manner, the fixing structure is completed only by one tooth of the stator core 7, and hence an influence on other components can be ignored. Further, among the above-mentioned tolerances of components, the tolerance of a distance between the end surface of the stator core 7 and the frame 5 including the flange 4 does not need to be taken into consideration, and hence the fluctuations in tolerance can be reduced by that amount.

As described above, also in this embodiment, the wire connection plate holder 10, the busbar 9, and the wire connection plate cover 11 are pressed and fixed using the elastic force of the sheet metal member 12, and hence the same effect as that of the above-mentioned first embodiment can be obtained. In addition, in this embodiment, the sheet metal member 12 is fixed on the stator core 7, and the fixing structure is completed only by one tooth of the stator core 7. Accordingly, the influence on other components can be ignored. Further, among the tolerances of components, the tolerance of the distance between the end surface of the stator core 7 and the frame 5 does not need to be taken into consideration.

Fifth Embodiment

Figure 6:
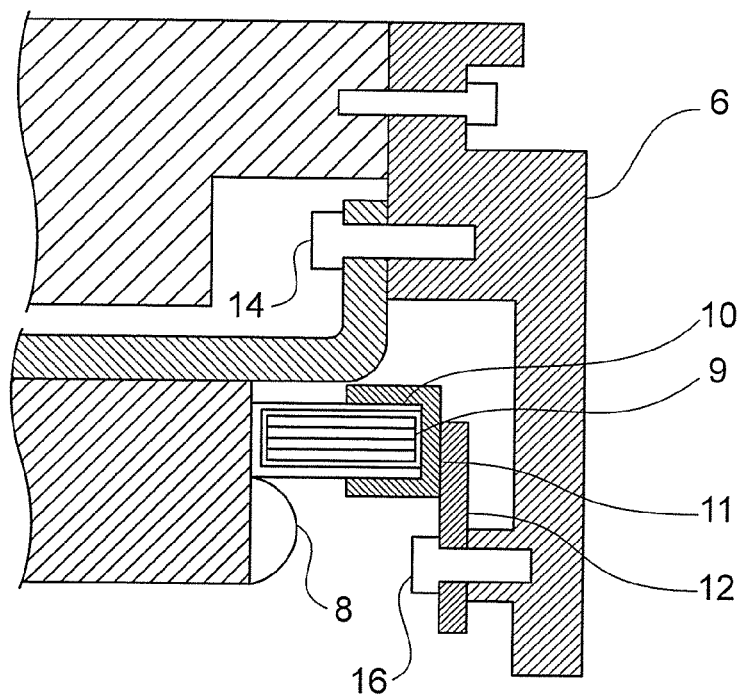
FIG. 6 is a partial cross-sectional view illustrating a configuration of a wire connection plate fixing structure according to a fifth embodiment of the present invention.

FIG. 6 is a cross-sectional view illustrating configurations of a wire connection plate fixing structure and a rotating electrical machine according to a fifth embodiment of the present invention. The entire configuration of the rotating electrical machine according to the fifth embodiment is the same as the configuration described in the above-mentioned first embodiment, and hence description thereof is omitted herein. FIG. 6 and FIG. 1 differ in that the sheet metal member 12 is screwed on the aluminum frame 6 with a bolt 16 in FIG. 6. Further, in FIG. 1, the flange 4 of the frame 5, the sheet metal member 12, and the aluminum frame 6 are fastened together with one bolt 14 at the same time, whereas in FIG. 6, the flange 4 of the frame 5 and the aluminum frame 6 are fastened together with the bolt 14. The other configuration is the same as that of the above-mentioned first embodiment, and hence description thereof is omitted herein.

In this embodiment, as illustrated in FIG. 6, one end of the sheet metal member 12 is screwed on the aluminum frame 6 with the bolt 16. The sheet metal member 12 is formed into a substantially rectangular elongate plate-like shape. Unlike the first embodiment etc., the sheet metal member 12 of this embodiment is not subjected to sheet metal bending, and hence the sheet metal member 12 is in a flat plate state. Further, another end of the sheet metal member 12 extends in the radial direction so as to press the wire connection plate holder 10 and the wire connection plate cover 11 onto the stator core 7. Note that, also in this embodiment, one end of the sheet metal member 12 is fixed, whereas another end thereof is a movable end. Accordingly, the sheet metal member 12 has a function of a plate spring. Therefore, also in this embodiment, the wire connection plate holder 10, the busbar 9, and the wire connection plate cover 11 can be pressed and fixed in the axial direction using the elastic force of the sheet metal member 12.

As described above, also in this embodiment, the wire connection plate holder 10, the busbar 9, and the wire connection plate cover 11 are pressed and fixed using the elastic force of the sheet metal member 12, and hence the same effect as that of the above-mentioned first embodiment can be attained. In addition, in this embodiment, the sheet metal member 12 is screwed on the aluminum frame 6 with the bolt 16. With this configuration, the sheet metal member 12 can be used without being subjected to sheet metal bending, and hence an accumulation amount of the tolerance is reduced.

Sixth Embodiment

Figure 7:
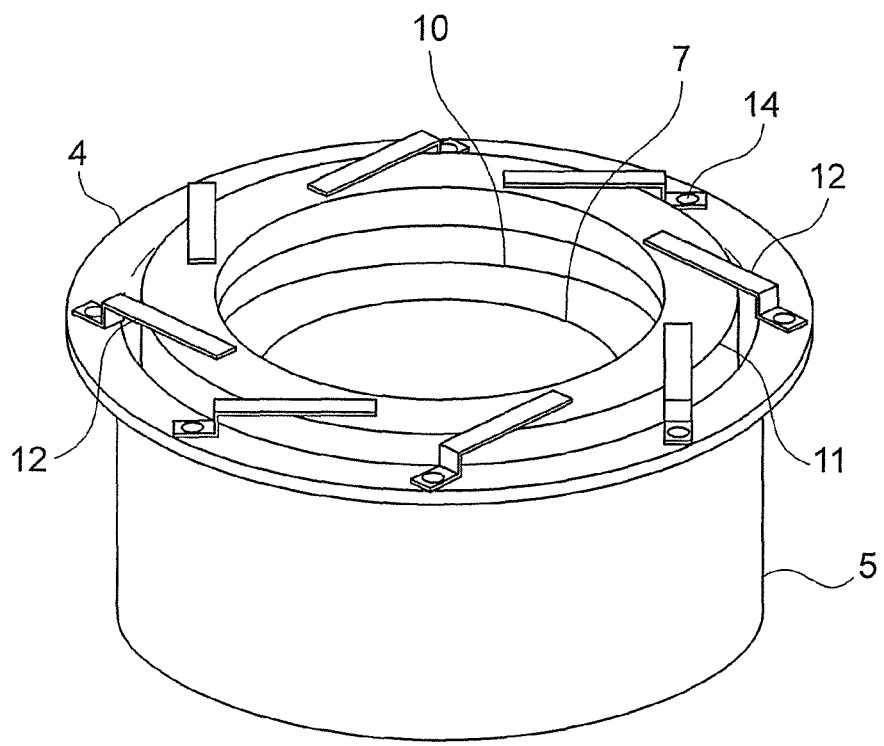
FIG. 7 is a perspective view illustrating a configuration of a rotating electrical machine according to a sixth embodiment of the present invention.

FIG. 7 is a perspective view illustrating configurations of a wire connection plate fixing structure and a rotating electrical machine according to a sixth embodiment of the present invention. The entire configuration of the rotating electrical machine according to the sixth embodiment is the same as the configuration described in the above-mentioned first embodiment, and hence description thereof is omitted herein. FIG. 7 and FIG. 1(b) differ in that the sheet metal member 12 is fixed in the radial direction in FIG. 1(b), whereas the sheet metal member 12 is fixed in a direction oblique to the radial direction in FIG. 7. The other configuration is the same as that of the above-mentioned first embodiment, and hence description thereof is omitted herein.

In this embodiment, as illustrated in FIG. 7, the sheet metal member 12 is fixed in a direction oblique to the radial direction by a predetermined angle. The predetermined angle may be determined as appropriate, but it is desired that the predetermined angle be determined in a range of from 15° to 85° with respect to the radial direction. In this manner, the sheet metal member 12 is arranged obliquely to the radial direction, and thus a length of the sheet metal member 12 is larger than the length of the sheet metal member 12 of the first embodiment. Accordingly, when a point of application of the sheet metal member 12 is set on an end portion thereof on the wire connection plate cover 11 side and a fulcrum of the sheet metal member 12 is set on an end portion thereof on the bolt 14 side, a distance from the point of application to the fulcrum can be increased. Accordingly, even in a case where the sheet metal member 12 bears the same displacement, stress occurring on the sheet metal member 12 can be reduced.

As described above, also in this embodiment, the wire connection plate holder 10, the busbar 9, and the wire connection plate cover 11 are pressed and fixed using the elastic force of the sheet metal member 12, and hence the same effect as that of the above-mentioned first embodiment can be attained. In addition, in this embodiment, the sheet metal member 12 is arranged obliquely by the predetermined angle, and hence the distance from the point of application to the fulcrum of the sheet metal member 12 can be increased. Accordingly, even in a case where the sheet metal member 12 bears the same displacement, stress occurring on the sheet metal member 12 can be reduced.

Seventh Embodiment

Figure 8:
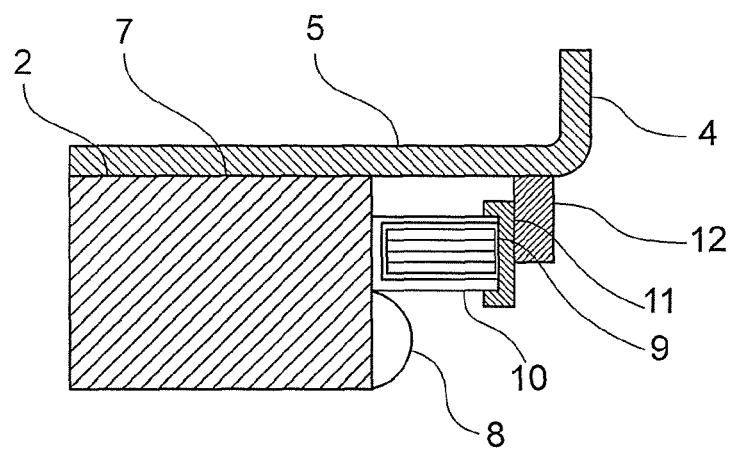
FIG. 8 is a partial cross-sectional view illustrating a configuration of a wire connection plate fixing structure according to a seventh embodiment of the present invention.

FIG. 8 is a cross-sectional view illustrating configurations of a wire connection plate fixing structure and a rotating electrical machine according to a seventh embodiment of the present invention. The entire configuration of the rotating electrical machine according to the seventh embodiment is the same as the configuration described in the above-mentioned first embodiment, and hence description thereof is omitted herein. FIG. 8 and FIG. 1(a) differ in that the sheet metal member 12 is fixed on the flange 4 of the frame 5 with the bolt 14 in FIG. 1(a), whereas a fixing method and a fixing position of the sheet metal member 12 in FIG. 8 are different from those in FIG. 8. The other configuration is the same as that of the above-mentioned first embodiment, and hence description thereof is omitted herein.

In this embodiment, one end of the sheet metal member 12 is fixed on the frame 5 by press-fitting, or fixed by welding. In this embodiment, the one end of the sheet metal member 12 is fixed not on the flange 4 but on a body portion of the frame 5. The sheet metal member 12 is formed into a substantially rectangular elongate plate-like shape. Unlike the first embodiment, the sheet metal member 12 according to this embodiment is not subjected to sheet metal bending, and hence the sheet metal member 12 is in a flat plate state. Further, another end of the sheet metal member 12 extends in the radial direction so as to press the wire connection plate holder 10 and the wire connection plate cover 11 onto the stator core 7.

Thus, the sheet metal member 12 can be used without being subjected to sheet metal bending, and a component can be completed by the frame 5 and the stator 2. Further, the sheet metal member 12 and the wire connection plate cover 11 are formed integrally with each other, and thus the number of components can be reduced.

As described above, also in this embodiment, the wire connection plate holder 10, the busbar 9, and the wire connection plate cover 11 are pressed and fixed using the elastic force of the sheet metal member 12, and hence the same effect as that of the above-mentioned first embodiment can be obtained. In addition, in this embodiment, one end of the sheet metal member 12 is fixed on the body of the frame 5. Accordingly, the sheet metal member 12 can be used without being subjected to sheet metal bending, and the component can be completed by the frame 5 and the stator 2.

REFERENCE SIGNS LIST 1 rotor, 2 stator, 3 shaft, 4 flange, 5 frame, 6 aluminum frame (housing), 7 stator core, 8 coil, 9 busbar, 10 wire connection plate holder, 11 wire connection plate cover, 12 sheet metal member, 13, 13A burring portion, 14 bolt, 15 caulking portion, 16 bolt.

The invention claimed is:

1. A fixing structure for fixing a wire connection plate, the wire connection plate comprising a busbar formed into an annular shape, and a holder for holding the busbar, the fixing structure comprising:
a frame having a cylindrical shape, for accommodating the wire connection plate therein; and
a sheet metal member for fixing the wire connection plate,
one end of the sheet metal member being fixed on an outer peripheral portion of the frame,
another end of the sheet metal member being a movable end extending toward the wire connection plate accommodated in the frame, for pressing an end surface of the wire connection plate in an axial direction of the frame, to thereby fix the wire connection plate,
wherein the wire connection plate comprises a cover having electrically insulating property, and
wherein the sheet metal member presses the wire connection plate through an intermediation of the cover such that no electric current is conducted by the sheet metal member.

2. The fixing structure according to claim 1, wherein the sheet metal member has an elastic force so that the sheet metal member presses the wire connection plate in the axial direction by the elastic force.

3. The fixing structure according to claim 1,
wherein the movable end of the sheet metal member comprises a caulking portion, and
wherein the sheet metal member is pressed onto the wire connection plate in the axial direction so that the caulking portion of the movable end is embedded in the wire connection plate, to thereby fix the wire connection plate.

4. The fixing structure according to claim 1, wherein the one end of the sheet metal member, which is fixed on the outer peripheral portion of the frame, comprises a burring portion to be press-fitted into the frame.

5. The fixing structure according to claim 1, further comprising a housing fixed on the frame,
wherein the sheet metal member is fastened and fixed on both the frame and the housing.

6. The fixing structure according to claim 1, wherein a hollow portion is formed within the annular shape of the busbar.

7. The fixing structure according to claim 1, further comprising a wire connection plate cover formed in a U-shape so as to allow the wire connection plate to be inserted therein.

8. The fixing structure according to claim 7, wherein the another end of the sheet metal member presses a surface of the wire connection plate cover in the axial direction of the frame, to thereby fix the wire connection plate.

9. The fixing structure according to claim 7, wherein the another end of the sheet metal member presses a surface of the wire connection plate cover in the axial direction of the frame, to thereby fix the wire connection plate.

10. The fixing structure according to claim 1, wherein the busbar contacts a plurality of coils of a stator core such that the busbar is electrically connected to the plurality of coils.

11. The fixing structure according to claim 1, wherein the stator further comprises a wire connection plate cover formed in a U-shape so as to allow the wire connection plate to be inserted therein.

12. The fixing structure according to claim 1, wherein the busbar contacts the coil such that the busbar is electrically connected to the coil.

13. The fixing structure according to claim 1, further comprising a second sheet metal member for fixing the wire connection plate,
one end of the second sheet metal member being fixed on the outer peripheral portion of the frame,
another end of the second sheet metal member being a movable end extending toward the wire connection plate accommodated in the frame, for pressing the end surface of the wire connection plate in the axial direction of the frame, to thereby fix the wire connection plate,
wherein the second sheet metal member presses the wire connection plate through the intermediation of the cover such that no electric current is conducted by the second sheet metal member.

14. A fixing structure for fixing a wire connection plate, the wire connection plate comprising a busbar formed into an annular shape, and a holder for holding the busbar, the fixing structure comprising:
  a frame having a cylindrical shape, for accommodating the wire connection plate therein; and
  a sheet metal member for fixing the wire connection plate,
  the wire connection plate being used for a rotating electrical machine,
  the sheet metal member having a U-shape so that the wire connection plate is arranged at an inside of the sheet metal member,
  one end of the sheet metal member being fixed on a stator core of the rotating electrical machine,
  another end of the sheet metal member being a movable end, for pressing an end surface of the wire connection plate toward the stator core side, to thereby fix the wire connection plate,
  wherein the wire connection plate comprises a cover having electrically insulating property, and
  wherein the sheet metal member presses the wire connection plate through an intermediation of the cover such that no electric current is conducted by the sheet metal member.

15. The fixing structure according to claim 14, wherein a hollow portion is formed within the annular shape of the busbar.

16. The fixing structure according to claim 14, further comprising a wire connection plate cover formed in a U-shape so as to allow the wire connection plate to be inserted therein.

17. The fixing structure according to claim 16, wherein the another end of the sheet metal member presses a surface of the wire connection plate cover in the axial direction of the frame, to thereby fix the wire connection plate.

18. The fixing structure according to claim 14, wherein the busbar contacts a plurality of coils of a stator core such that the busbar is electrically connected to the plurality of coils.

19. A fixing method for fixing a wire connection plate, the wire connection plate comprising a busbar formed into an annular shape, and a holder for holding the busbar, the fixing method comprising the steps of:
  accommodating the wire connection plate in a frame;
  preparing a sheet metal member formed of a flat plate;
  fixing one end of the sheet metal member on an outer peripheral portion of the frame; and
  extending another end of the sheet metal member toward the wire connection plate accommodated in the frame, and pressing an end surface of the wire connection plate in an axial direction of the frame by the another end, to thereby fix the wire connection plate,
  wherein the wire connection plate includes a cover having electrically insulating property, and
  wherein the pressing the end surface of the wire connection plate comprises pressing the wire connection plate through an intermediation of the cover such that no electric current is conducted by the sheet metal member.

20. The fixing method according to claim 19, wherein a hollow portion is formed within the annular shape of the busbar.

21. The fixing method according to claim 19, wherein the busbar contacts a plurality of coils of a stator core such that the busbar is electrically connected to the plurality of coils.

22. A rotating electrical machine, comprising:
  a stator having a cylindrical shape;
  a rotor provided at an inside of the stator in a rotatable manner; and
  a frame having a cylindrical shape, for fixing the stator thereon and accommodating the stator and the rotor therein,
  the stator comprising:
    a stator core having a cylindrical shape;
    a coil wound around the stator core;
    a wire connection plate comprising a busbar formed into an annular shape, and a holder for holding the busbar; and
    a sheet metal member for fixing the wire connection plate, one end of the sheet metal member being fixed on an outer peripheral portion of the frame, and
    another end of the sheet metal member extending toward the wire connection plate accommodated in the frame, for pressing an end surface of the wire connection plate in an axial direction of the frame, to thereby fix the wire connection plate,
  wherein the wire connection plate comprises a cover having electrically insulating property, and
  wherein the sheet metal member presses the wire connection plate through an intermediation of the cover such that no electric current is conducted by the sheet metal member.

23. The fixing structure according to claim 22, wherein a hollow portion is formed within the annular shape of the busbar.

* * * * *